United States Patent [19]
Baltschun

[11] 4,192,414

[45] Mar. 11, 1980

[54] HYDRAULIC PRESS TOOL PROTECTION ARRANGEMENT

[75] Inventor: Horst Baltschun, Rülzheim, Fed. Rep. of Germany

[73] Assignee: SMG Suddeutsche Maschinenbau Gesellschaft mbH, Fed. Rep. of Germany

[21] Appl. No.: 854,642

[22] Filed: Nov. 25, 1977

[30] Foreign Application Priority Data

Nov. 24, 1976 [DE] Fed. Rep. of Germany ....... 2653279

[51] Int. Cl.[2] .......................... B26D 7/24; F16B 11/15

[52] U.S. Cl. .................................... 192/129 R; 83/58; 83/61; 83/554; 83/617; 91/356; 100/53; 192/134

[58] Field of Search ........... 192/129 R, 129 A, 129 B, 192/134; 83/58, 61, 554, 617; 91/356, 411 B; 100/53

[56] References Cited

U.S. PATENT DOCUMENTS

| | | | |
|---|---|---|---|
| 2,216,973 | 10/1940 | Harrington et al. | 91/356 X |
| 2,250,389 | 7/1941 | Miller | 91/356 |
| 2,400,486 | 5/1946 | Carlyle | 192/134 |
| 2,805,447 | 9/1957 | Voges | 91/356 X |
| 3,452,399 | 7/1969 | Blumer | 100/53 X |
| 3,568,553 | 3/1971 | Wanner | 83/58 |
| 3,991,639 | 11/1976 | Pfeifer | 100/53 |
| 4,010,679 | 3/1977 | Dybel | 192/129 A |
| 4,060,160 | 11/1977 | Lieber | 192/134 |

*Primary Examiner*—Allan D. Herrmann
*Attorney, Agent, or Firm*—Craig and Antonelli

[57] ABSTRACT

An arrangement for protecting tools in a hydraulic press against overloading if an object is present in a tool space of the hydraulic press. A displacement switch monitors at least a portion of a path of movement of a press ram with an additional switching device providing an output signal during a predetermined movement of the press ram. A control circuit evaluates a sequence of the output signals of the displacement switch and additional switching device in such a manner that a fault signal is formed when the additional switching device provides an output signal prior to an output signal from the displacement switch. The additional switching device may be constructed as a switch element which provides an output signal in dependence upon a pressure or a speed of flow of a pressure medium in a hydraulic circuit.

6 Claims, 4 Drawing Figures

HYDRAULIC PRESS TOOL PROTECTION ARRANGEMENT

The present invention relates to a protection arrangement and, more particularly, to an arrangement for protecting a set of tools in a hydraulic press against overloading if an object is situated in a tool space of the press.

In Swiss Pat. No. 490,963, a tool protection device is proposed wherein a switching element, responsive to a movement of a ram, is in the form of a displacement switch, that is, a switch responsive to a relative movement of two parts of a press with respect to one another. In the proposed device, the additional displacement switch is so disposed that it scans relative movements between the driven ram and a tool carrier plate which precedes the ram in a direction of a working stroke. The tool carrier plate is guided for relative movement and is usually referred to as a scanning table.

One disadvantage of the proposed protection device resides in the fact that there is a reduction in the accuracy of the guidance of a tool fastened on the tool carrier plate, which guidance is based on the interposition of the tool carrier plate which is movable relative to the ram.

A further disadvantage of the proposed protection device resides in the fact that considerable difficulties are encountered in the operational control of the press. Specifically, if an object is present in a tool space of the press, the tool carrier plate together with a tool fastened thereon must first be accelerated relative to the ram which continues its movement, that is, in absolute terms must be decelerated, before any relative movement which can be sensed by the additional displacement switch can occur between the ram and the tool carrier plate. Because of the considerable masses involved, the response of the displacement switch is thereby retarded. Additionally, despite the presence of an object in a tool space, considerable forces nevertheless occur on the press tools.

The aim underlying the present invention essentially resides in providing a protection arrangement which permits a response of an additional switching element with the least possible delay when the protection arrangement is applied to a press having a ram on which an associated tool is fastened without the interposition of a preceding tool carrier plate which is movable relative to the ram which is adapted to be moved by means of at least one fast stroke cylinder piston unit and at least one working stroke pressure unit in a direction of a working stroke.

According to advantageous features of the present invention, a displacement switch means is provided for monitoring a part of a movement path of the ram and for providing an output signal indicative of such movement with a further switching means being provided which responds or provides an output signal of the ram movement. A control circuit means is operatively connected to both switching means for evaluating a sequence of the response or output signal of the switching means in such a manner that a fault signal is formed in the event an output signal is received from the further switching means prior to an output signal from the displacement switch means.

According to further advantageous features of the present invention, when the protection arrangement is applied to a press whose ram is adapted to be moved by means of at least one fast stroke cylinder piston unit and at least one working stroke pressure unit in the direction of the working stroke, the switching element is in the form of at least one switch which is connected to or in a pressure medium supply line to a fast stroke cylinder piston unit with the at least one switch being responsive to a pressure or speed of flow of pressure medium in the supply line.

As with the displacement switch in the proposed protection device, the displacement switch in accordance with the present invention is so arranged and adjusted so as to respond when the tool moved by the ram has moved toward the other tool until its distance from the other tool corresponds or substantially corresponds to a predetermined thickness of the workpiece which is to be processed. A fault signal by which the continuation of the movement of the ram in the working direction is suppressed can then be produced if there is present in the tool space an obstacle in the form of, for example, a second unprocessed workpiece of a predetermined thickness, a workpiece processed in a preceding work stroke, a waste material, or other foreign body.

The same action, namely, generation of a fault signal, also takes place in accordance with the present invention if, before the position monitored by the displacement switch is reached, the resistance of the ram increases, for example, as a result of a fault in the guiding of the ram to such an extent that an increase of resistance to movement by the ram simulates the presence of an object in a tool space of the press. The significant advantage of the protection arrangement of the present invention results from the fact that the further switch, responsive to a pressure or speed of flow of the pressure medium, is connected to or in a pressure medium supply line leading to a fast stroke cylinder piston unit. Specifically, because of the fast stroke action of the fast stroke cylinder piston units and the fact that these units usually have relatively small operative surfaces loaded by a pressure medium, if an object is disposed in a tool space of the press, only relatively low forces can occur on the tools and a rapid increase in pressure or rapid decrease in speed of flow, to which the further switch can respond in order to produce a fault signal, is ensured in the pressure medium supply lines.

For the purposes of adjusting a sensitivity of the protection arrangement and adapting the same so as to be responsive to different pressures of the pressure medium, according to another feature of the present invention, the response pressure of the further switch is adjustable by, for example, making the further switch in the form of a piezoelectric measuring switch element with an adjustable electric threshold switch being connected to an output of the pressure measuring switch element.

Additionally, according to the present invention, the further switch may be in the form of a pressure limiting valve which provides an output signal when such valve responds. The output signal may, however, also be provided by a flow monitor which monitors pressure medium flowing off with the monitor being connected to an output of the pressure limiting valve.

Moreover, according to the present invention, the output of the pressure limiting valve may be connected to a hydraulically operated directional valve by which the pressure medium in at least one fast stroke cylinder piston unit is switched over to an opposite direction of action to the working stroke direction.

Accordingly, it is an object of the present invention to provide a protection arrangement for working tools of hydraulic presses which avoids by simple means the drawbacks and disadvantages encountered in the prior art.

Another object of the present invention resides in providing a protection arrangement for working tools of hydraulic presses wherein only relatively low forces can occur on the tools in the event a foreign body or other object is present in a tool space of the hydraulic press.

A further object of the present invention resides in providing a protection arrangement for working tools which functions reliably under all operating conditions.

An additional object of the present invention resides in providing a protection arrangement for working tools of hydraulic presses which is readily adjustable so as to permit adaptation to varying operating pressures of the hydraulic presses.

These and other objects, features and advantages of the present invention will become more apparent from the following description when taken in connection with the accompanying drawings which show, for the purposes of illustration only, several embodiments in accordance with the present invention, and wherein.

Figure 1:
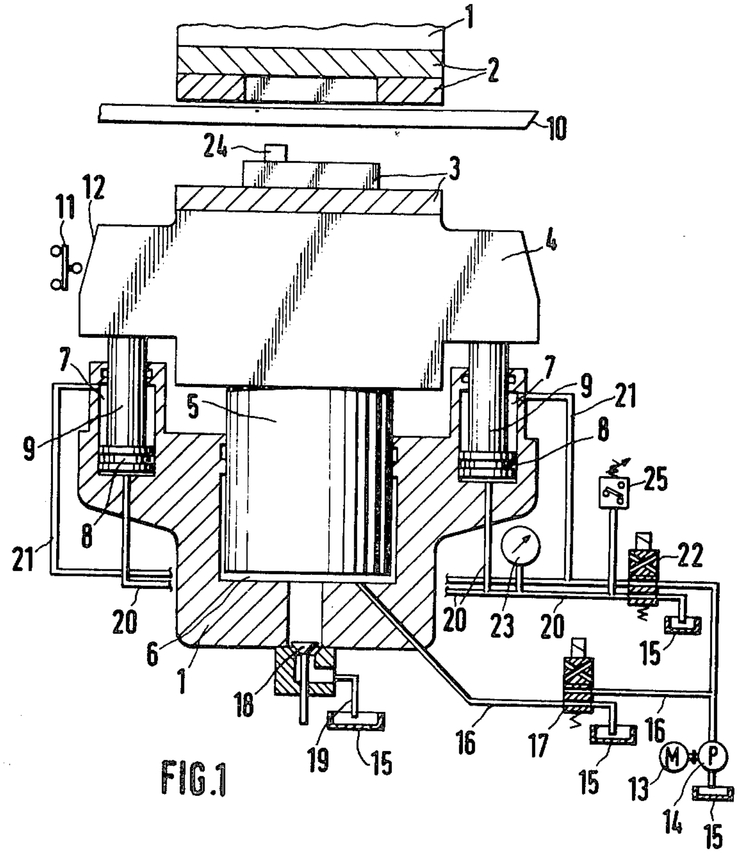
FIG. 1 is a cross-sectional partially schematic view of a tool protection arrangement arranged at a hydraulic press in accordance with the present invention.

Referring now to the drawings wherein like reference numerals are used throughout the various views to designate like parts and, more particularly, to FIG. 1, according to this figure, an upper tool 2 of a set of tools is fastened on a top part of a frame 1 of a hydraulic press with a lower tool 3 of the set of tools being fastened on a ram 4 guided for vertical movement in a lower part of the frame 1, which ram has an upward working stroke direction. Between the upper tool and the lower tool 3 is disposed a strip 10 of material from which a workpiece is to be cut or punched. The reference numeral 24 designates an object or foreign body arranged in a tool space which gives rise to a fault, which object 24 is disposed on the lower tool 3.

A working stroke pressure unit is provided which includes a plunger 5 and a pressure medium chamber 6 disposed in the lower part of the frame 1 with the plunger 5 acting centrally on a lower face of the ram 4. On each side of the working stroke pressure unit is disposed respective fast stroke cylinder piston units, each of which includes a cylinder 7 disposed in a lower part of the frame 1 and pistons 8 which act by means of piston rod 9 on the lower face of the ram 4.

A displacement switch 11 is mounted on the frame 1 so as to be adjustable in the direction of movement of the ram 4. The displacement switch is actuated or responds to the movement of the ram 4 by a switch arm or the like of the displacement switch 11 contacting a control surface 12 on the ram 4 when the ram 4 has reached a position in which the lower tool 3 is at a distance from the upper tool 2 which practically corresponds to the thickness of the workpiece strip 10.

Pressure medium required for operating the working stroke pressure unit and the fast stroke cylinder piston units is drawn in from a pressure medium source which includes a reservoir 15 and a pump 14 which is driven by a motor 13 with the pressure medium being pumped into a pressure medium supply system which includes a number of pressure medium conduits or pipes 16, 20, 21.

A solenoid valve 17 is arranged in one of the pressure medium conduits or pipes 16 which connects the pressure medium source with the pressure medium chamber 6. The pressure medium chamber 6 is in communication with the reservoir 15 by way of a one-way or non-return valve 18 and a suction pipe 19. The other pressure medium conduits or pipes 20, 21 establish communication with the upper and lower cylinder spaces in the cylinder 7 by way of an additional solenoid valve 22. A pressure gauge 23 is connected to the pressure medium conduit or pipe 20.

As shown in FIG. 1, a switch 25 is connected to the pressure medium conduit or pipe 20. The switch 25 is a piezoelectric pressure measuring switch which is responsive to the pressure or flow of pressure medium in the pressure medium conduit or pipe 20. The pressure switch 25 is adjustable so as to be responsive to desired pressure levels or pressure flow in the pressure medium conduit or pipe 20.

Figure 2:
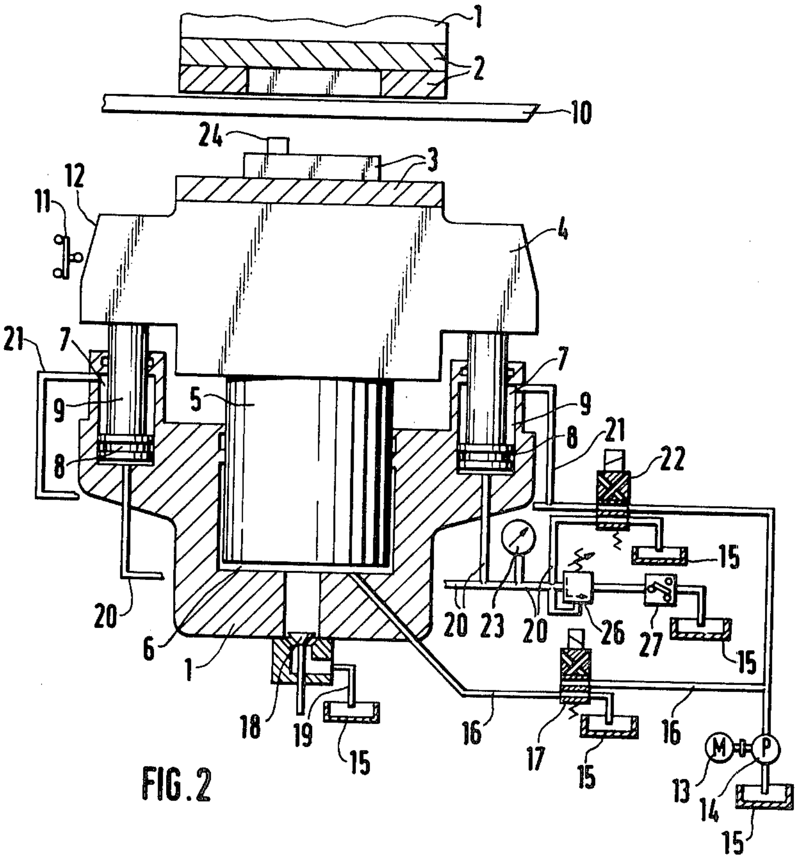
FIG. 2 is a cross-sectional partially schematic view of a second embodiment of a tool protection arrangement arranged at a hydraulic press in accordance with the present invention.

As shown in FIG. 2, an adjustable pressure limiting valve 26 may be arranged in the conduit or pipe 20. The pressure limiting the valve 26 is responsive to a pressure in the pressure medium conduit or pipe 20 with an output of the pressure limiting valve 26 being connected to a flow monitor 27. As with the pressure measuring switch 25, the pressure limiting valve 26 is adjustable so as to be responsive to desired pressures in the presssure medium conduit or pipe 20.

Figure 3:
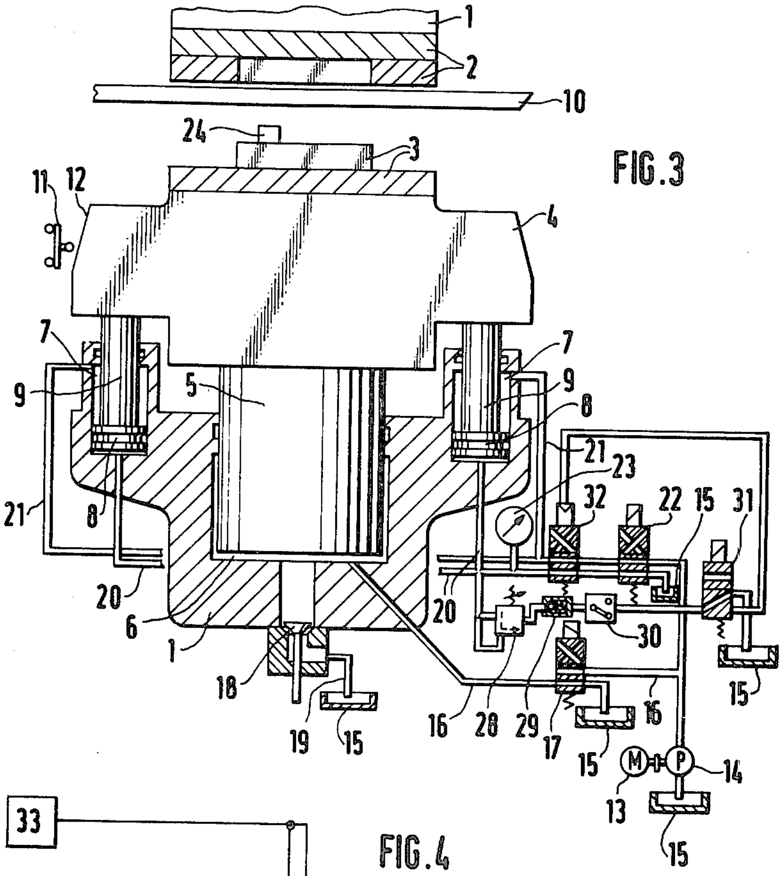
FIG. 3 is a cross-sectional partially schematic view of a third embodiment of a tool protection arrangement arranged at a hydraulic press in accordance with the present invention.

As shown most clearly in FIG. 3, an adjustable pressure limiting valve 28 is connected to the conduit or pipe 20 with an output of the limiting valve 28 being connected to a flow monitor 30 by way of a one-way or non-return valve 29. The flow monitor 30 is followed by a further solenoid valve 31 by means of which a hydraulically operated directional valve 32, disposed in the pipes 20, 21 between the solenoid valve 22 and the cylinder chambers in the cylinder 7, can be operated.

Outlet pipes leading from the pressure medium spaces of the working stroke pressure unit and the fast stroke cylinder piston units leading to the pressure medium reservoir 15 are connected to the solenoid valves 17, 22, the flow monitor 27 (FIG. 2), and the additional solenoid valve 31 (FIG. 3).

Figure 4:
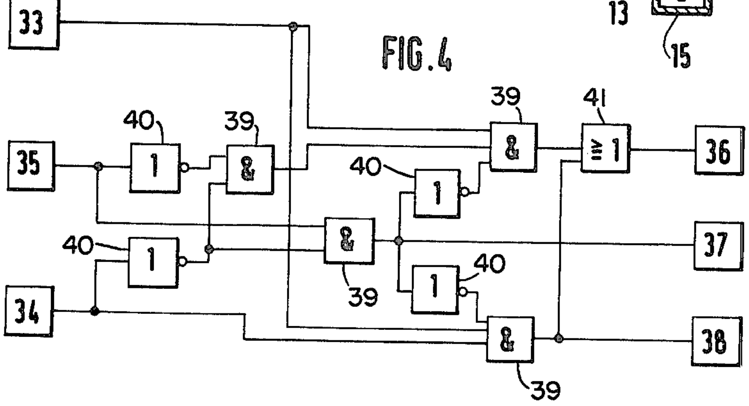
FIG. 4 is a logic control circuit for the tool protection arrangement in accordance with the present invention.

As shown in FIG. 4, a logic control circuit is provided which includes logic switching elements such as AND gates 39, OR gates 41 and inverters 40 interposed between signal inputs 33, 34, 35 and signal outputs 36, 37, 38.

In FIG. 4, the input signal 33 represents a command signal from an automatic press control arrangement or a signal from a push buttom operating the press with either signal being generated when the ram 4 is to be operated in a working stroke direction. The input signal 34 represents a response or output signal of the displacement switch 11. The input signal 35 respresents a response or output signal of the pressure switch 25 (FIG. 1) or flow monitor 27, 30 (FIGS. 2, 3).

The signal output 36 controls the operation of the solenoid valve 22 for effecting a change-over or switching of the solenoid valve 22 from the position shown in the drawing. The output signal 37 controls the operation of the solenoid valve 22 for effecting a changeover the solenoid valve from a displaced position to the position shown in the drawing. The output signal 38 energizes the solenoid valve 17 for effecting a change-over of the valve 17 from the position shown in the drawing.

Considering the logic circuit of FIG. 4 with the embodiments of FIGS. 1 and 2, assuming the input signals 33 and 34 are received by the logic circuit, output signals 36, 38 would displace the solenoid valves 17, 22 from the position illustrated so as to permit pressure medium to flow from the reservoir 15 through conduits 16, 20 to the lower pressure space of the work stroke pressure unit and the fast stroke cylinder piston unit so that the ram is displaced in a working stroke direction. The displacement of the solenoid valves 17, 22 would also place the upper cylinder space of the work stroke pressure unit and the fast stroke cylinder piston unit in communication with the pressure medium reservoir 15.

If a foreign body or object 24 is located in the tool space of the embodiment of FIGS. 1 and 2, the pressure switch 25 or flow monitor 27 provides the input signal 35 to the logic circuit prior to the input signal 34 of the displacement switch 11, thereby generating a fault signal so that the solenoid valve 22 is displaced to the illustrated position and communicates the lower pressure chamber of the fast stroke cylinder piston units with the pressure medium reservoir 15.

With regard to the arrangement of FIG. 3, additional functions exist inasmuch as, upon an operation of the solenoid valve 22 by means of the signal output 36, the additional solenoid valve 31 is additionally changed over with a time lag from the position illustrated in the drawing, so that when the flow monitor 30 then responds, the hydraulically operated directional valve 32 is briefly changed over to a position not shown in the drawing by the pressure medium flowing through the hydraulic circuit. The operation of the solenoid valve 22 by means of the signal output 37 additionally brings about a change-over of the additional solenoid valve 31 to the position shown in the drawing so that the hydraulically operated directional valve 32 returns to the position shown in the drawing.

As readily apparent, the function of the logic circuit of FIG. 4 determines the fundamental mode of operation of the various examples of the protection arrangement in accordance with the present invention.

While I have shown and described several embodiments of a tool protection arrangement in accordance with the present invention, it is understood that the same is not limited thereto, but is susceptible of numerous changes and modifications as known to a person skilled in the art to which it pertains, and I therefore do not wish to be restricted to the details shown and described herein, but intend to cover all such changes and modifications as are encompassed by the scope of the appended claims.

I claim:

1. An arrangement for protecting a set of tools in a hydraulic press against overloading by an object present in a tool space of the hydraulic press, the arrangement comprising a displacement switch means for monitoring at least a portion of a path of movement of a press ram in a working stroke direction and for providing an output signal indicative of a predetermined movement of the press ram, an additional switching means for providing an output signal during a movement of the press ram, and a control circuit means for evaluating a sequence of the output signals of the displacement switch means and the additional switching means in such a manner that a fault signal is generated when the additional switching means provides an output signal prior to an output signal from the displacement switch means, characterized in that at least one fast-stroke cylinder-piston means and at least one working stroke pressure means are provided for causing a displacement of the press ram in the working stroke direction with one of a piston and a cylinder of the at least one cylinder-piston means being connected to the press ram, the predetermined movement of the press ram is a movement to a position at which tools in a tool space of the hydraulic press are spaced from each other by a distance at least substantially corresponding to a thickness of a workpiece to be processed, the additional switching means includes at least one switch connected to a pressure medium supply line communicating with the fast-stroke cylinder-piston means, said at least one switch providing an output signal in dependence upon one of a pressure and speed of flow of a pressure medium in the pressure medium supply line during a displacement of the press ram in the working stroke direction at points in time prior to or at a beginning of a working of the workpiece by the tools of the hydraulic press.

2. An arrangement according to claim 1, characterized in that means are provided for adjusting a response pressure of the at least one switch.

3. An arrangement according to claim 2, characterized in that the at least one switch is a piezoelectric pressure measuring switching element, and in that an adjustable electric threshold switch is connected to an output of the piezoelectric pressure measuring switching element.

4. An arrangement according to claim 1, characterized in that the at least one switch is a pressure limiting valve.

5. An arrangement according to claim 4, characterized in that a flow monitor means is provided for monitoring a flow of the pressure medium, said flow monitor means is connected to an output of the pressure limiting valve.

6. An arrangement according to claim 4, characterized in that a hydraulically operated directional valve means is connected to an output of the pressure limiting valve.

* * * * *